(12) United States Patent
Okura

(10) Patent No.: US 11,777,421 B2
(45) Date of Patent: Oct. 3, 2023

(54) METHOD FOR ADJUSTING DEVICE VOLTAGE OF POWER STORAGE DEVICE

(71) Applicant: Prime Planet Energy & Solutions, Inc., Tokyo (JP)

(72) Inventor: Toshinori Okura, Toyota (JP)

(73) Assignee: PRIME PLANET ENERGY & SOLUTIONS, INC., Tokyo (JP)

(*) Notice: Subject to any disclaimer, the term of this patent is extended or adjusted under 35 U.S.C. 154(b) by 0 days.

(21) Appl. No.: 17/678,041

(22) Filed: Feb. 23, 2022

(65) Prior Publication Data

US 2022/0278546 A1    Sep. 1, 2022

(30) Foreign Application Priority Data

Feb. 26, 2021 (JP) .................................. 2021-029787

(51) Int. Cl.
*H02J 7/34* (2006.01)
*H02M 7/5387* (2007.01)
*H02J 7/00* (2006.01)
*H01M 10/42* (2006.01)

(52) U.S. Cl.
CPC ....... *H02M 7/53871* (2013.01); *H02J 7/0047* (2013.01); *H01M 2010/4271* (2013.01); *H02J 7/345* (2013.01)

(58) Field of Classification Search
CPC .... H02M 7/53871; H02J 7/0047; H02J 7/345; H02J 7/00712; H02J 7/0013; H02J 7/0048; H01M 2010/4271; H01M 10/425; H01M 10/4207; H01M 10/482; H01M 10/44; H01M 10/441; H01M 10/4285; H01M 10/48; H01M 10/486; G01R 31/388; G01R 31/3865; G01R 31/392; G01R 31/382
See application file for complete search history.

(56) References Cited

U.S. PATENT DOCUMENTS

| 2015/0180076 A1 | 6/2015 | Hasegawa et al. |
| 2019/0011502 A1* | 1/2019 | Kobayashi .......... H01M 10/486 |
| 2019/0041466 A1* | 2/2019 | Goto .................. G01R 31/3842 |

(Continued)

FOREIGN PATENT DOCUMENTS

| JP | 2000260482 A | 9/2000 |
| JP | 2009145137 A | 7/2009 |

(Continued)

*Primary Examiner* — Elim Ortiz
(74) *Attorney, Agent, or Firm* — HAUPTMAN HAM, LLP

(57) ABSTRACT

In a method for adjusting a device voltage of a power storage device, when this device is represented as an equivalent circuit in which a parallel circuit of a capacitive device component and a short-circuit resistance indicating a magnitude of self-discharge of the device component is connected in series with a DC resistance of the power storage device, the power storage device has a property that, while the power storage device is pressed under a load and the device component is charged to generate a component voltage, the component voltage lowers when the load is reduced, but rises when the load is increased. The method includes a) component-voltage changing by load change of changing the load applied to the power storage device under a first load, generating a first component voltage in the device component, from the first load to change the component voltage from the first component voltage.

5 Claims, 8 Drawing Sheets

(56) References Cited

U.S. PATENT DOCUMENTS

2019/0198942 A1    6/2019  Kobayashi et al.
2019/0250216 A1*  8/2019  Kobayashi ........... G01R 31/367

FOREIGN PATENT DOCUMENTS

| JP | 2015-118867 A | 6/2015 |
| JP | 2015122169 A | 7/2015 |
| JP | 201916558 A | 1/2019 |
| JP | 2019113450 A | 7/2019 |
| JP | 202071054 A | 5/2020 |

* cited by examiner

METHOD FOR ADJUSTING DEVICE VOLTAGE OF POWER STORAGE DEVICE

CROSS-REFERENCE TO RELATED APPLICATIONS

This application is based upon and claims the benefit of priority to Japanese Patent Application No. 2021-029787 filed on Feb. 26, 2021, the entire contents of which are incorporated herein by reference.

BACKGROUND

Technical Field

The present disclosure relates to a device voltage adjustment method for adjusting a device voltage of a power storage device.

Related Art

A power storage device, such as a lithium ion secondary battery (hereinafter, also simply referred to as a battery 1) is generally represented as an equivalent circuit Ec shown in FIG. 1. Specifically, the equivalent circuit Ec of the battery 1 is composed of three components; a capacitive battery component (a device component) 1B, a short-circuit resistance Rp, and a DC resistance Rs. This circuit Ec is represented by a circuit configuration that a parallel circuit Pc constituted by a battery component 1B and a short-circuit resistance Rp which are connected in parallel is connected in series with a DC resistance Rs. The battery component 1B is a capacitance component formed by the battery (the storage device) 1 and is assumed to generate therein a component voltage VBB when the battery 1 is charged. The DC resistance Rs is a battery resistance that appears to exist in series with the battery component 1B between both terminal members 30 and 40 of the battery 1. On the other hand, the short-circuit resistance Rp is a resistance indicating the magnitude of self-discharge caused by an internal short-circuit of the battery component 1B. A self-discharge current ID indicated by an arrowed broken line is a self-discharge current flowing from the battery component 1B to the short-circuit resistance Rp.

When this battery (the power storage device) 1 is connected to an external power supply EP with probes P1 and P2, a contact resistance occurs between one probe P1 of the external power supply EP and the positive terminal member 30 and between the other probe P2 of the external power supply EP and the negative terminal member 40. In FIG. 1, the sum of those resistances is shown as a contact resistance R12. Further, a wiring resistance Rw also is distributed in the external power supply EP and through a wire extending from the external power supply EP to the probes P1 and P2. The current flowing from the external power supply EP to the battery 1 is assumed as a power-supply current IP and the voltage occurring between the terminal members 30 and 40 is assumed as a battery voltage VB.

When the power-supply current IP is zero (IP=0), the component voltage VBB occurring in the battery component 1B coincides with a battery voltage occurring between the terminal members 30 and 40 of the battery 1. As can be understood from this, the component voltage VBB also corresponds to an open circuit voltage (OCV) of the battery 1.

Meanwhile, in each stage of producing, testing, or using a power storage device such as the battery 1, in some cases, there are some cases where it is desired to conform, or equalize, the battery voltage (device voltage) VB in an open circuit state, that is, the component voltage VBB, to a reference voltage, change the magnitude of the component voltage VBB, or change the magnitude of the battery voltage VB while a current is flowing. In those cases, the battery 1 is connected to the external power supply EP and charged or discharged to adjust the battery voltage VB (the component voltage VBB) to a desired magnitude.

Conversely, there is a case where the battery voltage VB is measured in advance, and a power-supply voltage equal to the battery voltage VB in the open circuit state (i.e., the component voltage VBB) is applied from the external power supply EP to the battery 1. A conventional art related to the latter case is disclosed in for example Japanese patent unexamined application publication No. 2019-016558 (JP 2019-016558A) (see claims thereof).

SUMMARY

Technical Problems

Meanwhile, the batteries (the storage devices) 1 have individual differences, such as slightly different individual characteristics and different magnitudes in self-discharge current ID (the magnitude of the short-circuit resistance Rp). Therefore, for example, even if a plurality of batteries 1 are charged to the same component voltage VBB, the batteries 1 become different in the magnitude of the component voltage VBB over time or by temperature changes. For example, when a plurality of batteries 1 charged to the same component voltage VBB are similarly subjected to a high temperature aging (for example, 63° C.×20 hours) and then cooled, the component voltages VBB of the batteries 1 slightly varies in magnitude, that is, they are not equal to each other.

In contrast, for performing a test or inspection under the same conditions on those batteries (storage devices) 1, there are some cases where it is desired to start the test or the like after conforming the component voltages VBB of the batteries 1 to the reference voltage. Those cases where it is desired to slightly change the current component voltage VBB, such as making the component voltages VBB to conform to the reference voltage, may exist in each stage of production, test, and use of the battery (the power storage device) 1.

On the other hand, the inventors found that, in some batteries (power storage devices) charged and subjected to a load, the component voltage (the open circuit voltage) slightly lowers when the applied load is reduced, while the component voltage (the open circuit voltage) slightly rises when the load is increased.

The present disclosure has been made to address the above problems and has a purpose to provide a method for adjusting a component voltage of a power storage device.

Means of Solving the Problems (1) To achieve the above-mentioned purpose, one aspect of the present disclosure provides a method for adjusting a device voltage of a power storage device, wherein when the power storage device is represented as an equivalent circuit in which a parallel circuit constituted by a capacitive device component and a short-circuit resistance indicating a magnitude of self-discharge of the device component is connected in series with a DC resistance of the power storage device, the power storage device has a property that, while the power storage device is pressed under a load and the device component is charged to generate a component voltage, the component voltage lowers when the load is reduced, whereas the component voltage rises when the load is increased, and wherein the method comprises: a) component-voltage changing by load change of changing the load applied to the power storage device, which is pressed under a first load and generates a first component voltage in the device component, from the first load to change the component voltage from the first component voltage.

The power storage device to be inspected by the foregoing adjustment method has characteristics that the component voltage (open circuit voltage) lowers when the load applied to the power storage device is reduced, while the component voltage rises when the load is increased, as described above.

The foregoing adjustment method includes the component-voltage changing by load change a), in which the load applied to the power storage device is changed from the first load to change the component voltage from the first component voltage. This device voltage adjustment method can therefore change and adjust the component voltage (open circuit voltage) of the power storage device without charging/discharging of the power storage device. Alternatively, the method can adjust the component voltage of the power storage device to regulate the current flowing through the power storage device.

The above-described device voltage adjusting method for the power storage device can be performed the process of producing the power storage device and also is available for a power storage device during use or used after being mounted on an apparatus, such as a car, or after being placed alone on a market. Further, the foregoing method can also be performed in a performance check test of the power storage device, which is carried out in a development stage or mass production stage of the power storage device.

Further, the power storage device may include for example a secondary battery, such as a lithium ion secondary battery, and a capacitor, such as an electric double-layer capacitor and a lithium ion capacitor.

As described above, the component voltage corresponds to an open circuit voltage generated between the terminals of the power storage device when the current flowing from the outside to the power storage device is zero. Thus, the terminals of the power storage device are not necessarily cut (open) from the circuit to measure the component voltage.

The load change performed in the component-voltage changing by load change a) may include for example a pattern to monotonically decrease the first load and a pattern to monotonically increase the first load. Another example is a pattern to increase and decrease which the load. This load increasing and decreasing pattern may be configured to decrease the load once and then increase the load and alternatively to increase the load once and then decrease the load. It may also include a pattern to repeatedly increase and decrease the load.

(2) The method for adjusting a device voltage of the power storage device in (1) further comprises: b) component-voltage detecting of detecting the first component voltage of the power storage device pressed under the first load, the component-voltage detecting b) being performed before the component-voltage changing by load change a), wherein the component-voltage changing by load change a) is configured for c) conforming to a reference-voltage by load change of changing the load applied to the power storage device so that a changed component voltage obtained after load change conforms to a reference component voltage.

In this device voltage adjustment method, in the conforming to a reference-voltage by load change c), the load applied to the power storage device is changed from the first load to change the component voltage from the first component voltage into the changed component voltage equal to the reference component voltage. Specifically, this method enables to adjust the component voltage of the power storage device to the reference component voltage without charging and discharging. When this method is applied to each of power storage devices, the changed component voltages of the power storage devices can be made to conform to the reference component voltage.

(3) In the method for adjusting a device voltage of the power storage device in (1), wherein the power storage device includes a plurality of power storage devices, the method further comprises: d) multiple-component-voltage detecting of detecting the first component voltage of each of the plurality of power storage devices pressed under the first load, the multiple-component-voltage detecting d) being performed before the component-voltage changing by load change a), and assuming that: the first component voltage generated in a reference power storage device selected from the plurality of power storage devices is a reference first component voltage; and each of the other power storage devices other than the reference power storage device, in which the first component voltage is different from the reference first component voltage, is an adjusted power storage device, the component-voltage changing by load change a) is configured for e) component-voltage equalizing by load change of changing the load applied to the adjusted power storage device so that a changed component voltage of the adjusted power storage device after load change is equal to the reference first component voltage.

In this device voltage adjustment method, in the component-voltage equalizing by load change e), the load applied to the adjusted power storage device is changed from the first load so that the changed component voltages of the plurality of power storage devices become equal to the reference first component voltage. Specifically, this method enables to equalize the changed component voltages of the power storage devices to the reference first component voltage without charging and discharging each power storage device.

(4) In the method for adjusting a device voltage of the power storage device in (1), the power storage device includes a plurality of power storage devices, the component-voltage changing by load change a) is configured for f) conforming to a reference total voltage by load change of changing the load applied in common to the plurality of power storage devices so that a total component voltage equal to the sum of the component voltages of all the plurality of power storage devices conforms to a reference total component voltage.

In this device voltage adjustment method, in the conforming to a reference total voltage by load change f), the total component voltage of the plurality of power storage devices is made equal to the reference total component voltage. Specifically, this method enables to conform the total component voltage of the plurality of power storage devices to the reference total component voltage without charging and discharging the power storage devices.

The total component voltage may be obtained as follows. While the plurality of power storage devices is connected in series with each other, the total component voltage is obtained by measurement. Or alternatively, while the plurality of power storage devices is not connected to each other, individual component voltages of the power storage devices are summed to calculate the total component voltage.

DETAILED DESCRIPTION OF THE EXEMPLARY EMBODIMENTS

First Embodiment

Figure 2:
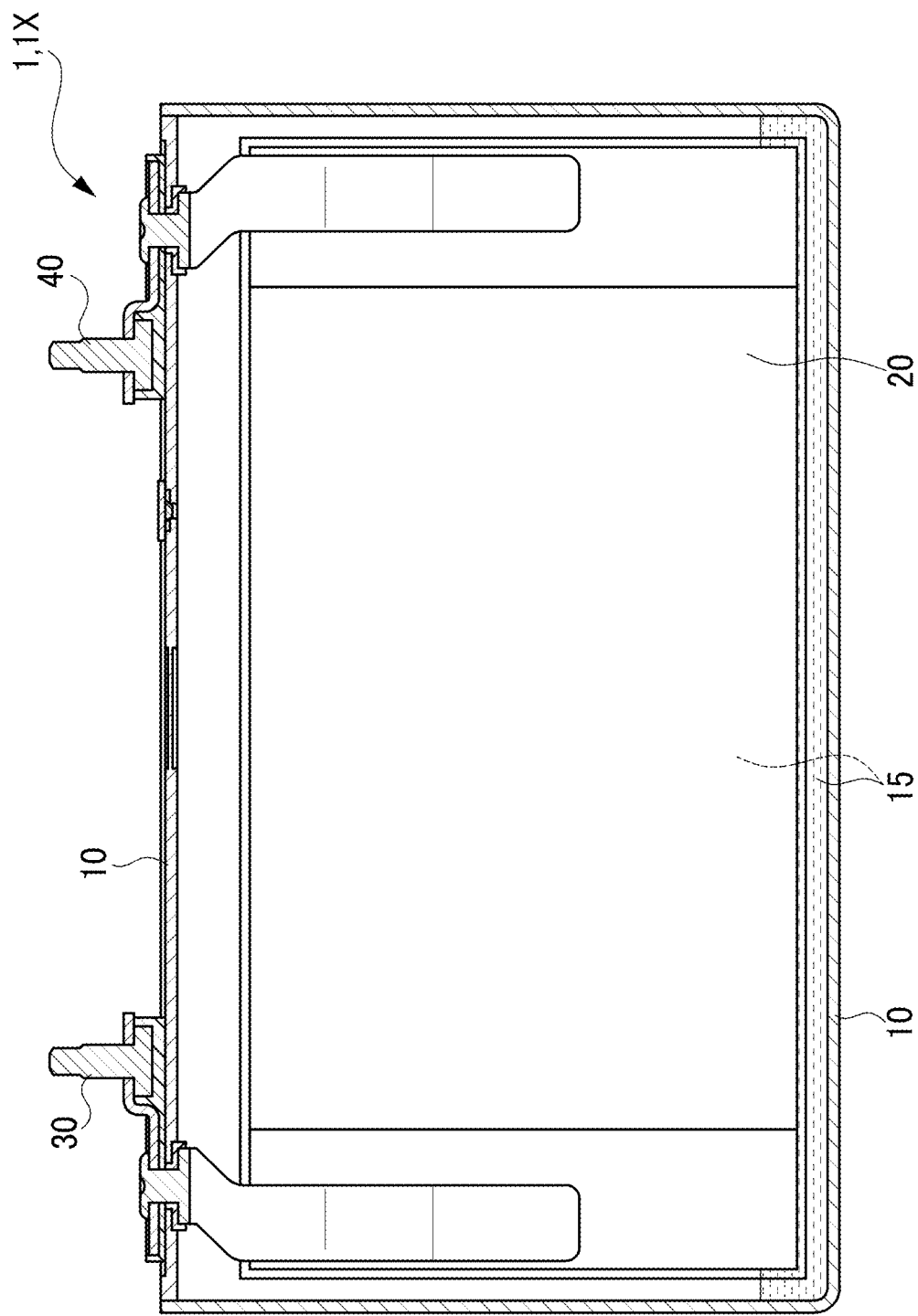
FIG. 2 is a longitudinal cross-sectional view of a battery in first to third embodiments and first and second modified embodiments.

A detailed description of a first embodiment of this disclosure will now be given referring to the accompanying drawings. FIG. 2 is a longitudinal cross-sectional view of a lithium ion secondary battery 1 in the first embodiment. This battery 1 includes a rectangular parallelepiped box-shaped battery case 10, a flat wound electrode body 20 and an electrolytic solution 15, which are accommodated in the battery case 10, a positive terminal member 30 and a negative terminal member 40 supported in the battery case 10, and others. In the first embodiment, the positive active material is a lithium transition metal composite oxide, specifically, lithium nickel cobalt manganese oxide, and the negative active material is carbon material, specifically, graphite. The same applies to batteries 1 in first and second modified embodiments, and second and third embodiments, which will be described later.

A self-discharge inspection method for determining the internal insulation property of the battery 1 and a method for producing the battery 1 including this self-discharge inspection method will be described below (see FIG. 4). In an assembly step S1, an uncharged battery 1X (see FIG. 2) is first assembled. An initial battery voltage measurement step S7 to a judgement step S12 which will be mentioned later also correspond to an inspection step of the method for producing the batteries 1.

Figure 3:
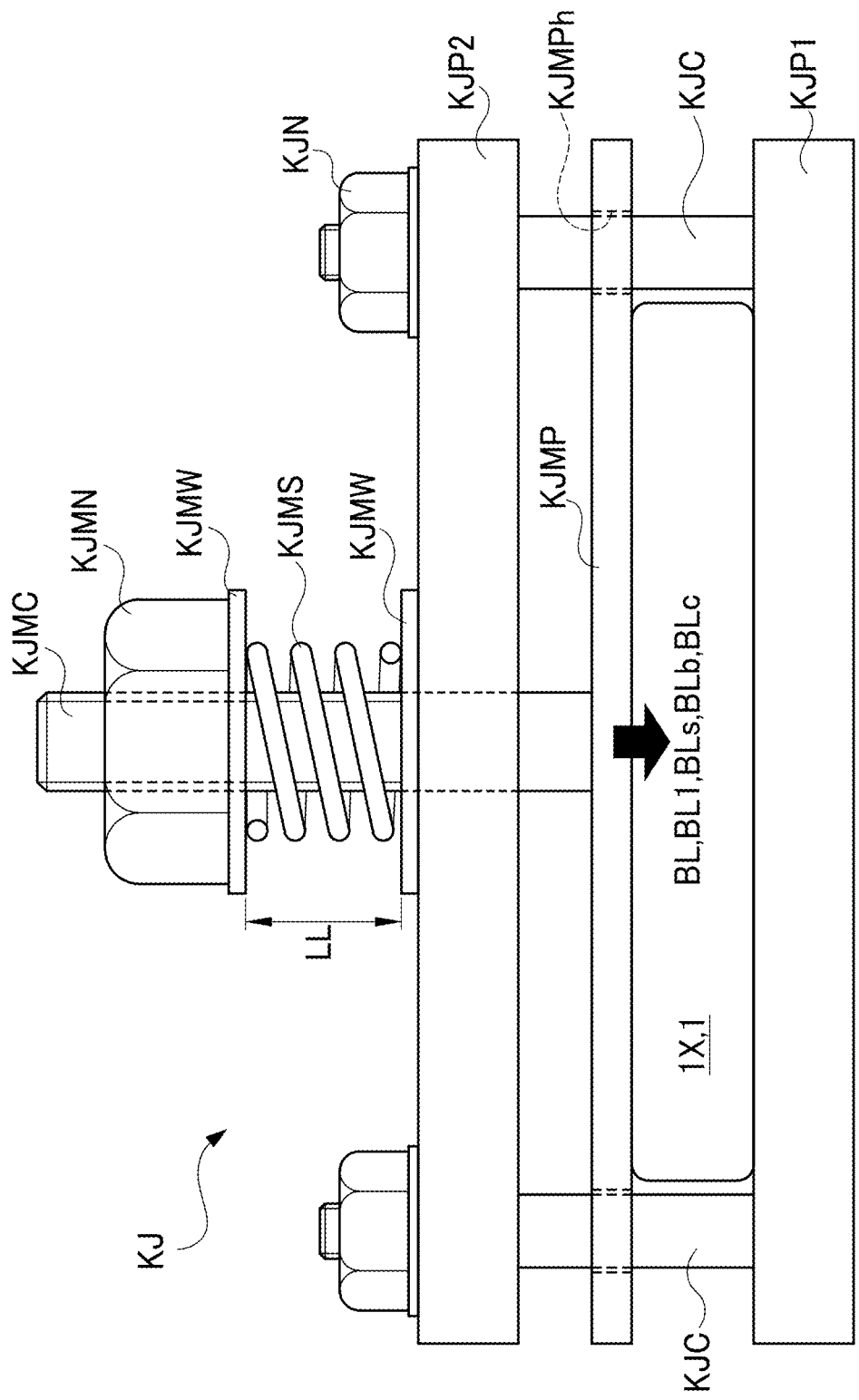
FIG. 3 is an explanatory view showing that the battery is placed in a jig capable of increasing and decreasing a load in the first and second embodiments and the first and second modified embodiments.

In a load application step S2, as a load BL, a predetermined first load BL1 is applied to the assembled battery 1X (which eventually becomes a battery 1). This first load BL1 is for example 918 kgf, i.e., 9 kN, in the first embodiment. Specifically, as shown in FIG. 3, the battery 1 (the battery 1X) is restrained in an elastically compressed state under the first load BL1 in a battery thickness direction corresponding to a perpendicular direction to the paper sheet of FIG. 2 by use of a restraining jig KJ. More specifically, using the restraining jig KJ having two fixed plates, i.e., a lower fixed plate KJP1 and an upper fixed plate KJP2 in the figure, which are fixedly spaced from each other with support rods KJC and securing nuts KJN, the battery 1 (the battery 1X) is sandwiched between the lower fixed plate KJP1 and a pressure plate KJMP. A rod-shaped pressing member KJMC is elastically pushed by use of its male screw part KJMCs, a pressing nut KJMN, and a compression spring KJMS held between two washers KJMW to apply a load BL to the battery 1 (the battery 1X).

As a preparatory work, a load cell (not shown) instead of the battery 1 is put between the fixed plate KJP1 and the pressure plate KJMP, and then the pressing nut KJMN is tightened, so that the relationship between the length LL of the compression spring KJMS (i.e., the distance between the washers KJMW located on both sides of the compression spring KJMS) and the load applied to the load cell is obtained in advance. Accordingly, the magnitude of the load BL applied to the battery 1 by the restraining jig KJ can be detected by measurement of the length LL of the compression spring KJMS.

Under the first load BL1 continuously applied to the battery 1 (the battery 1X) as above, the battery 1 undergoes an initial charge step S3 to a continuation judgement step S11 mentioned later. In each step, an ambient temperature TK around the battery 1 is detected by use of a temperature detecting device KTS having a temperature sensor KT including a thermistor. Further, a battery temperature TB of the battery 1 is detected by a temperature detecting device STS having a temperature sensor ST including a thermistor placed in contact with the battery case 10 at a predetermined position (see FIG. 1).

In the initial charge step S3, the uncharged battery 1X is charged for the first time to provide a charged battery 1. Specifically, under an initial charge temperature FT (20° C.), a charge and discharge device (not shown) is connected to the terminal members 30 and 40 of the battery 1X restrained with the restraining jig KJ to charge the battery 1X for the first time with a constant current constant voltage (CCCV) until the battery voltage VB of the battery 1X reaches a predetermined value (e.g., VB=4.0 V in the present embodiment).

In a high-temperature aging step S4, subsequently, the batteries 1 initially charged are left to stand for an aging period EK (EK=20 hours) under an aging temperature ET (ET=63° C.) while both the terminal members 30 and 40 of each battery 1 are opened. This high-temperature aging causes the battery voltage VB of each battery 1 to decrease to a battery voltage corresponding to about 80% SOC.

In a cooling step S5, the batteries 1 are placed in a cooling chamber CR under a cooling temperature CT (CT=20° C.) for 20 minutes and forcibly cooled with a fan to adjust the battery temperature TB to approximately 20° C., i.e., TB≈20° C. (see FIG. 4).

In a leaving step S6, furthermore, the batteries 1 are transferred into a first chamber KR1 with the ambient temperature TK controlled to a first ambient temperature TK1 (TK1=20.0° C.), and left to stand for a leaving period HP (e.g., HP=30 minutes) to regulate the battery temperature TB of each battery 1 to a battery temperature TB1

Figure 4:
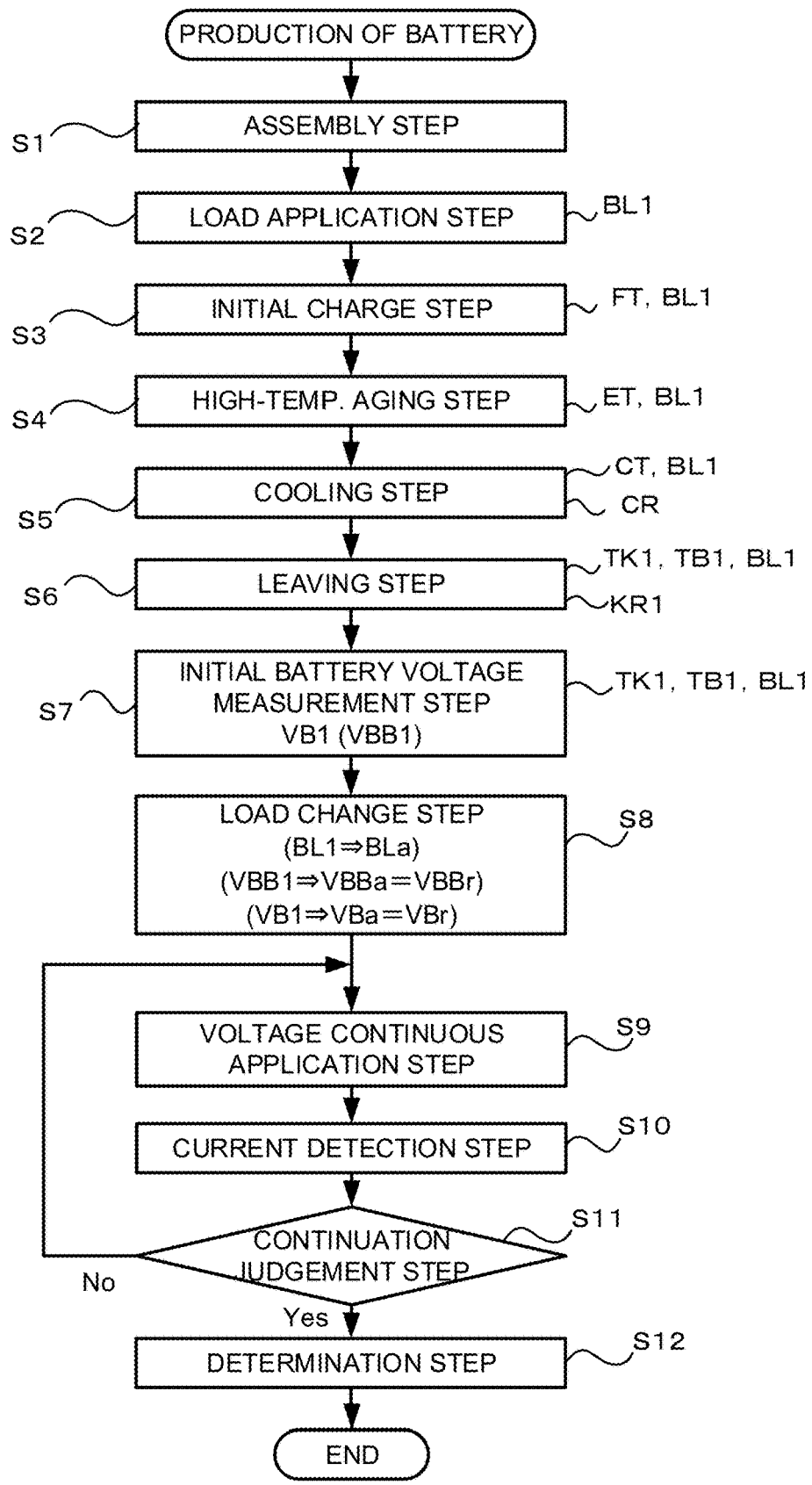
FIG. 4 is a flowchart of a process of producing a battery in the first embodiment, including an inspection step of inspecting self-discharge of a battery including a load change step.

(TB1=20.0° C.) equal to the first ambient temperature TK1 (see FIG. 4). After the leaving step S6, the initial battery voltage measurement step S7 through the continuation judgement step S11 which will be described later are also performed under the condition that the battery temperature TB of each battery 1 is the first battery temperature TB1.

Figure 1:
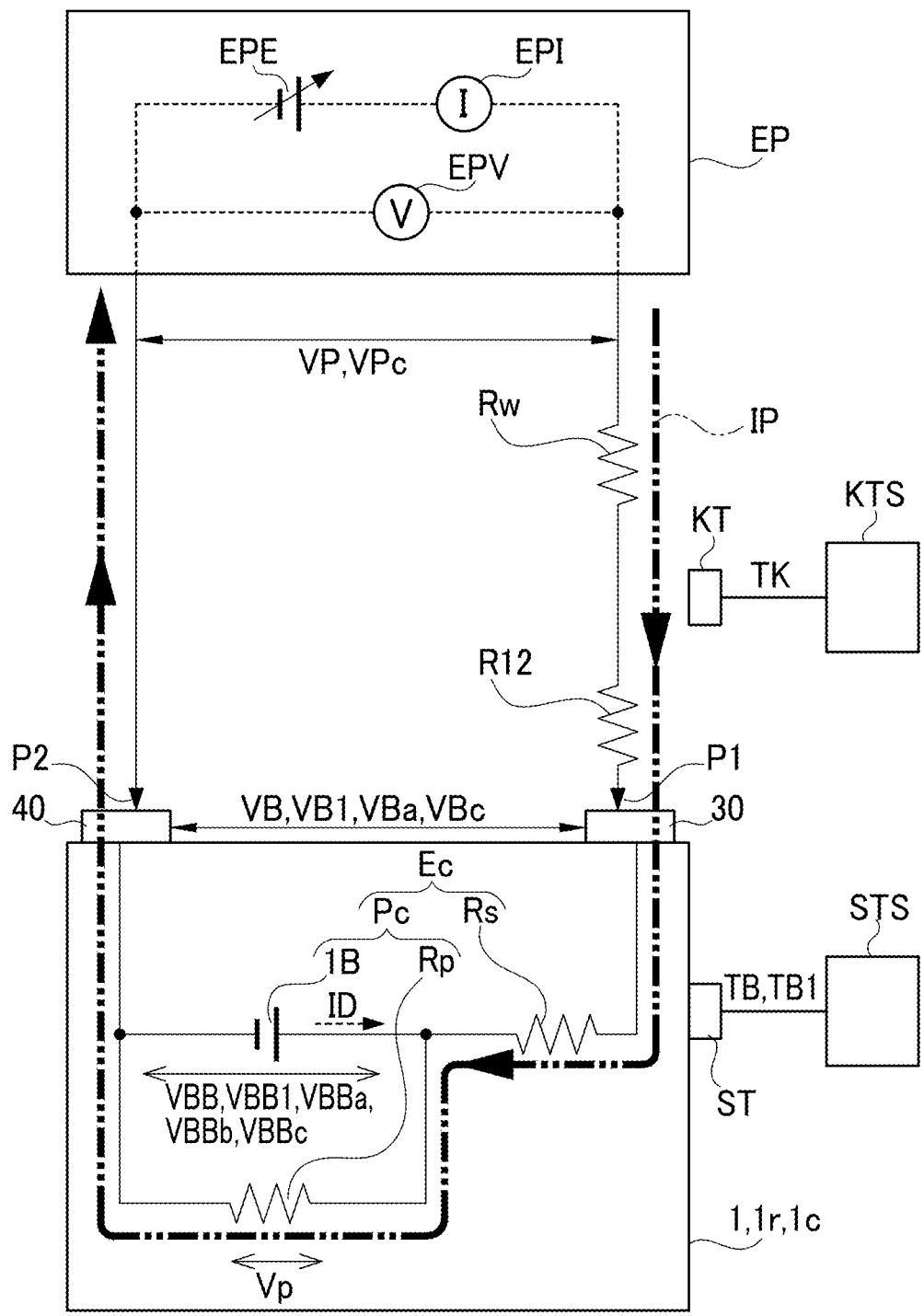
FIG. 1 is a circuit diagram of a battery connected to an external power supply, including an equivalent circuit.

In the initial battery voltage measurement step S7, under the first ambient temperature TK1, a first battery voltage VB1, which is an open circuit voltage of each battery 1 regulated at the first battery temperature TB1 (TB1=20.0° C.), is measured. Specifically, as shown in FIG. 1, a pair of probes P1 and P2 of an external power supply EP1 are respectively brought into contact with the positive terminal member 30 and the negative terminal member 40 of each battery 1 to connect the external power supply EP to each battery 1. A power-supply current IP flowing from the external power supply EP to each battery 1 is set to zero (IP=0, corresponding to a state where a DC voltage supply EPE is disconnected) and the first battery voltage VB1 of each battery 1 is measured with a voltmeter EPV.

The external power supply EP used in the first embodiment and the first modified embodiment shown in FIG. 1 is a variable constant-voltage constant-current power supply that can variably and precisely control a power-supply voltage VP to be generated in the DC voltage supply EPE. This external power supply EP further includes an ammeter EPI capable of precisely measuring a power-supply current IP to be supplied from the external power supply EP to the battery 1 as well as the voltmeter EPV capable of precisely measuring the power-supply voltage VP to be applied to the battery 1.

In FIG. 1, as described above, a wiring resistance Rw indicates a wiring resistance distributed inside the external power supply EP and also through a wire extending from the external power supply EP to the probes P1 and P2. A contact resistance R12 indicates the sum of the contact resistance generated between the first probe P1 of the external power supply EP and the positive terminal member 30 of the battery 1 and the contact resistance generated between the second probe P2 of the external power supply EP and the negative terminal member 40 of the battery 1.

FIG. 1 further shows an equivalent circuit of the battery 1 including a battery component 1B, a DC resistance Rs, and a short-circuit resistance Rp. The battery component 1B is a capacitance component provided by the battery 1 and assumed to generate a battery component voltage VBB. The DC resistance Rs is a battery resistance that appears to exist in series with the battery component 1B. In contrast, the short-circuit resistance Rp is a resistance indicating a magnitude of self-discharge caused by an internal short-circuit of the battery 1. A self-discharge current ID indicated by an arrowed broken line indicates a self-discharge current flowing from the battery component 1B to the short-circuit resistance Rp. The first battery voltage VB1 obtained in the initial battery voltage measurement step S7 corresponds to an open circuit voltage of the battery 1 at that time. A first component voltage VBB1, which is the component voltage of the battery component 1B at that time, coincides with the first battery voltage VB1 (VBB1=VB1).

While the first probe P1 remains in contact with the positive terminal member 30 and the second probe P2 remains in contact with the negative terminal member 40, i.e., the pair of probes P1 and P2 are neither disconnected nor reconnected to the terminal members 30 and 40, the initial battery voltage measurement step S7 through the continuation judgement step S11 mentioned later are performed. The same applies to the first modified embodiment.

This is to prevent the contact state of the probe P1 with the terminal member 30 and the contact state of the probe P2 with the terminal member 40 from becoming different every time they are disconnected and reconnected, and thus avoid variation in the magnitude of the contact resistance R12 generated between the probe P1 and the positive terminal member 30 and between the probe P2 and the negative terminal member 40.

Each battery 1 has a property that a component voltage VBB of the battery component 1B lowers when the load BL is reduced and in contrast the component voltage VBB rises when the load BL is increased. Specifically, the battery 1 in the first embodiment has a property that, when the load BL is reduced for example from the first load BL1 (=9 kN) to a load BL of 0, wherein a load change amount $\Delta BL$ is −9 kN, the component voltage VBB lowers by 6 µV from a previous component voltage VBB before load change, wherein a component voltage change amount $\Delta VBB$ is −6 µV.

Therefore, in the load change step S8, using the above-mentioned property, the pressing nut KJMN is turned to decrease or increase the load BL applied to the battery 1 by the restraining jig KJ from the above-mentioned first load BL1, and thus a changed load BLa is obtained (see FIG. 3). The pressing nut KJMN may be turned in one direction to monotonically decrease or increase the load BL in one direction. Accordingly, the component voltage VBB of the battery 1 (=the battery voltage VB in the open circuit state) slightly lowers or rises from the first component voltage VBB1 (=the first battery voltage VB1) measured in the initial battery voltage measuring step S7 to a changed component voltage VBBa equal to a predetermined reference component voltage VBBr (VBBa=VBBr). Specifically, the changed component voltage VBBa after load change is adjusted to a magnitude falling within the range of VBBa=VBBr±1 µV. Please note that, for example, the reference component voltage VBBr may be set at 3.800000 V. Further, the changed component voltage VBBa is equal to the battery voltage in the open circuit state after load change, which is assumed to be a changed battery voltage VBa (VBBa=VBa). This indicates that the changed battery voltage VBa in the open circuit state after the load change step S8 is made equal to the reference battery voltage VBr (=VBBr).

As described above, in the load change step S8, the changed component voltage VBBa of a specific battery 1 can be made equal to the reference component voltage VBBr, that is, the battery voltage VB is made equal to the reference battery voltage VBr. Further, when the plurality of batteries 1 to be inspected are subjected to the load change step S8, the component voltage VBB of each battery 1 can be made equal to the reference component voltage VBBr, i.e., the battery voltage VB is made equal to the reference battery voltage VBr, to make the component voltages VBB (battery voltages VB) equal to each other.

In the voltage continuous application step S9, successively, under the first ambient temperature TK1, when the first battery temperature TB1 is equal to the first ambient temperature TK1, the DC voltage supply EPE of the external power supply EP is caused to generate a continuous power-supply voltage VPc equal to the changed battery voltage VBa (VPc=VBa) that is obtained in the foregoing load change step S8. Then, voltage application to the battery 1 is started (the voltage application time t=0) and, from this point forward, the continuous power-supply voltage VPc is continuously applied. Specifically, the continuous power-supply voltage VPc generated in the external power supply EP is maintained at a magnitude equal to the changed battery voltage VBa obtained in the beginning. Because of VPc=VBa as above, accordingly, the power-supply current IP does not flow to the battery 1 in the beginning of the voltage continuous application step S9 as in JP 2019-016558A. In the first embodiment, it is not necessary to change the continuous power-supply voltage VPc generated in the external power supply EP for each battery 1. Thus, for the external power supply EP, a constant voltage supply with a predetermined reference battery voltage VBr (=reference component voltage VBBr) is sufficient.

When the continuous power supply voltage VPc equal to the changed battery voltage VBa is continuously applied to the battery 1 from the external power supply EP, as the voltage application time t passes, the component voltage VBB of the battery component 1B gradually lowers from the changed component voltage VBBa obtained at the start of the voltage continuous application step S9 (t=0). This is because the electric charge stored in the battery component 1B is gradually discharged by the self-discharge current ID through the short-circuit resistance Rp.

Therefore, the power supply current IP does not flow in the beginning of application of the changed battery voltage VBa (the voltage application time t=0). However, when the component voltage VBB generated in the battery component 1B becomes small, as can be easily understood from FIG. 1, a potential difference (VPc−VBB) is generated between both ends of a circuit DC resistance Rcs, which is the sum of three resistances, i.e., the DC resistance Rs, the contact resistance R12, and the wiring resistance Rw, so that the corresponding power-supply current IP flows in the battery 1 through a path indicated by an arrowed two-dot chain line (VPc=VBB+ (Rs+R12+Rw)·IP).

Then, the magnitude of the power supply current IP gradually increases as the component voltage VBB of the battery component 1B decreases. However, as can be understood from FIG. 1, when the power supply current IP increases as the component voltage VBB decreases and the counter electromotive force Vp (Vp=Rp·IP) generated in the short-circuit resistance Rp becomes equal to the component voltage VBB generated in the battery component 1B, the self-discharge current ID no longer flows out from the battery component 1B. Accordingly, the component voltage VBB in the battery component 1B stops decreasing, and the power supply current IP becomes stable with a magnitude equal to the unique self-discharge current ID (a stabilized power supply current) that is different for each battery 1.

In the current detection step S10, therefore, the power-supply current IP is detected by the ammeter EPI.

In the subsequent continuation determination step S11, it is determined whether to repeat the voltage continuous application step S9 and the current detection step S10 again. In the first embodiment, specifically, it is determined whether the power-supply current IP has stabilized after the start of application of the continuous power-supply voltage VPc to the battery 1. Herein, if No in S11, i.e., if the power-supply current IP is not stable, the process returns to the voltage continuous application step S9 to continue applying the continuous power-supply voltage VPc to the battery 1 (S9) and further detect the power-supply current IP again (S10). In contrast, if Yes in S11, i.e., if the power-supply current IP is stable, the process advances to the determination step S12 which will be described later.

In the continuation judgement step S11, the method for determining whether the power-supply current IP has stabilized may include for example sequentially calculating a moving average of the power-supply current values IP obtained in the current detection step S10 (e.g., a moving average of seven power-supply current values IP(n−6) to IP(n) obtained for last 60 seconds) and determining whether the power-supply current value IP has stabilized based on the transition of the moving average values (e.g., the magnitude of a difference value or a derivative value of the moving average values).

In a determination step S12, the self-discharge state of the battery 1 is determined based on the obtained power-supply current IP, concretely, by use of the sequence of the power-supply current values IP(n) which are obtained after the start of the voltage continuous application step S9 (the voltage application time t=0).

To be specific, in the first embodiment, from among a series of power-supply current values IP(0), IP(1), . . . , IP(n) obtained at predetermined time intervals (every 10 seconds in the present embodiment) in the current detection step S10, a moving average value MIP(n) of several (e.g., seven) power-supply current values IP(n−6) to IP(n) finally obtained in the continuation judgement step S11 is assumed as an ending average power-supply current value IPE. This ending average power-supply current value IPE indicates a value of the stabilized power-supply current IPs obtained in the ending of the voltage continuous application step S9, that is, a magnitude of the self-discharge current ID. This is compared with the threshold current value IPth to determine that a battery 1 having a smaller ending average power-supply current value IPE than the threshold current value IPth (IPE<IPth) is a non-defective product. Thus, a non-defective battery 1 having been charged and inspected for its self-discharge state can be produced.

In contrast, it is determined that a battery 1 having an ending average power-supply current value IPE that is equal to or larger than the threshold current value IPth (IPE≥IPth) is a defective battery 1. The battery 1 determined to be the defective battery is excluded and discarded or alternatively is reused after disassembly and so on.

According to the foregoing method of the first embodiment, in the production process of the batteries 1, the self-discharge inspection including the initial battery voltage measurement step S7 to the determination step S12 adopts the load change step S8. Thus, prior to the voltage continuous application step S9, the component voltage VBB (battery voltage VB in the open circuit state) of the battery 1 can be changed and adjusted without charging/discharging the battery 1. Specifically, the component voltage VBB of the battery 1 can be adjusted to the reference component voltage VBBr without charging/discharging the battery 1. Further, for each of the batteries 1, the changed component voltage VBBa can be made to conform to the reference component voltage VBBr. Thus, the voltage continuous application step S9 can be started in a state where all the changed component voltages VBBa of the batteries 1 are equal to the reference component voltage VBBr.

First Modified Embodiment

In the foregoing first embodiment, in the load change step S8 of the self-discharge inspection, the load BL applied to the battery 1 is reduced or increased from the first load BL1 to the changed load BLa, causing the component voltage VBB of the battery 1 to lower or rise from the first component voltage VBB1 to the changed component voltage VBBa equal to the reference component voltage VBBr, so that the battery voltage VB in the open circuit state is adjusted to the changed battery voltage VBa equal to the reference battery voltage VBr. Specifically, the load change step S8 is configured to change the load BL applied to the battery 1 so that the battery voltage VB becomes equal to the reference battery voltage VBr.

As an alternative, it may be configured to change the load BL applied to the battery 1, causing the component voltage VBB of the battery 1 to change, so that the power supply current IP flowing from the external power supply EP to the battery 1 becomes a changed power supply current IPa equal to a reference power supply current IPr.

The first modified embodiment differs from the first embodiment in that a voltage continuous application step S18 and a load change step S19 are performed instead of the load change step S8 and the voltage continuous application step S9. However, other parts are identical or similar to those in the first embodiment and thus the following description will be given with a focus on differences from the first embodiment. The details of the identical or similar parts are omitted or simplified.

Figure 5:
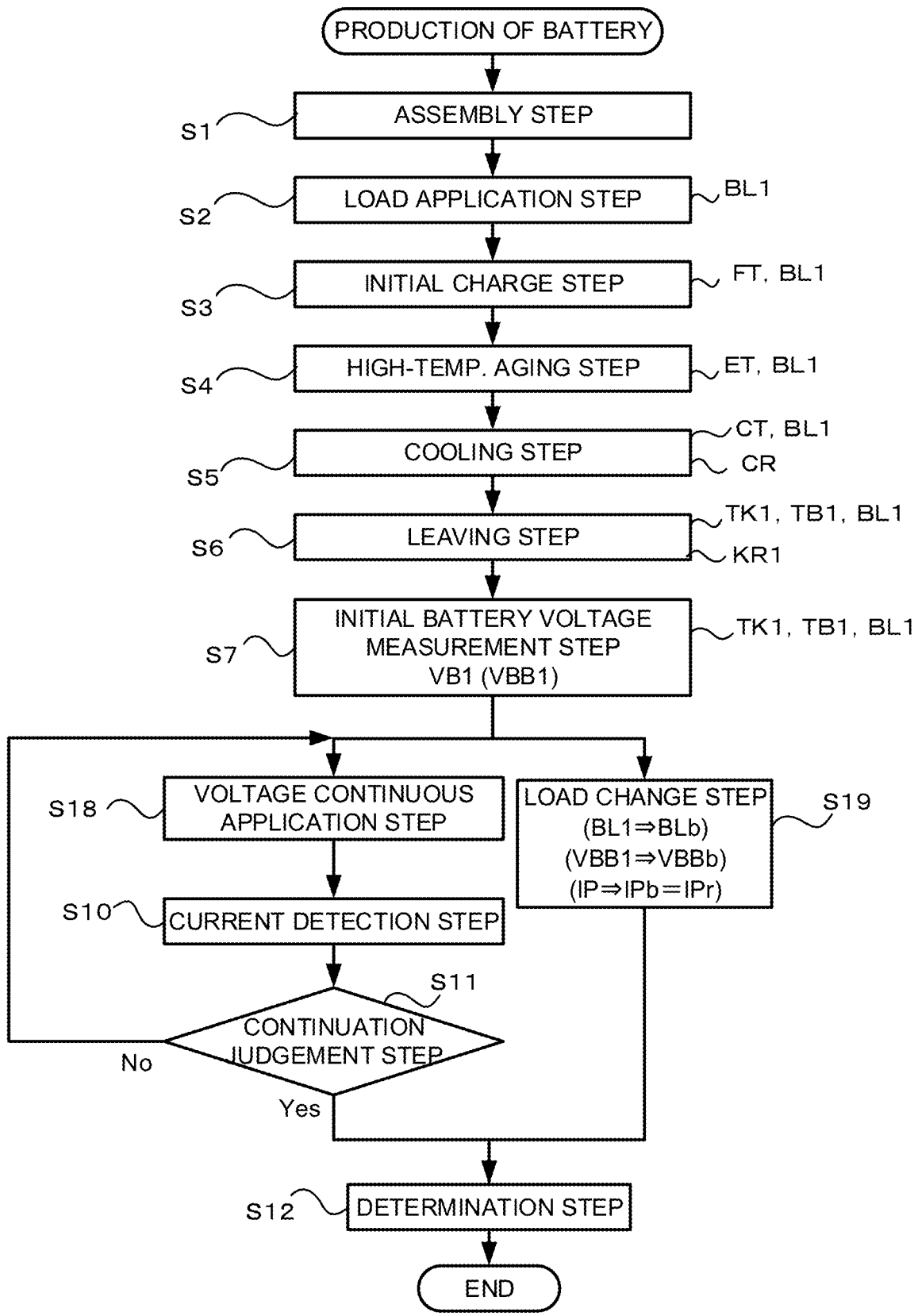
FIG. 5 is a flowchart of a process of producing a battery in the first modified embodiment, including an inspection step of inspecting self-discharge of a battery including a load change step.

Specifically, in the self-discharge inspection (S7, S18, S19, S10 to S12) performed in the production process of the battery 1 in the first modified embodiment shown in FIG. 5, the first battery voltage VB1 is measured in the initial battery voltage measurement step S7. In the subsequent voltage continuous application step S18, differently from the first embodiment, the continuous power supply voltage VPc equal to the first battery voltage VB1 measured in the initial battery voltage measurement step S7 is continuously applied to the battery 1 without performing the load change step S8.

On the other hand, in parallel with the voltage continuous application step S18, the load change step S19 is started immediately after the start of the voltage continuous application step S18 (for example, within the voltage application time t=1 minute) to reduce the first load BL1 applied to the battery 1 to the changed load BLb so that the changed power supply current IPa flowing from the external power supply EP to the battery 1 becomes equal to the reference power supply current IPr (for example, IPa=IPr=30 µA), thereby reducing the component voltage VBB of the battery 1 to the changed component voltage VBBa. This method enables the changed power supply current IPa equal to the reference power supply current IPr to flow to each battery 1 in the load change step S19, which is an initial stage of the voltage continuous application step S18, so that the power-supply current IP can converge promptly. In addition, in the self-discharge inspection of each battery 1, the magnitude of the power supply current IP in the initial stage of the voltage continuous application step S18 can be made to conform to that of the changed power supply current IPa (=reference power supply current IPr). This can facilitate the determination of the quality of each battery 1.

Also in the method of the first modified embodiment, the self-discharge inspection is configured to adopt the load change step S19 in parallel with the voltage continuous application step S18. Thus, this method can change the component voltage VBB of the battery 1 without charging/discharging the battery 1 and adjust the changed power-supply current IP flowing in the battery 1. Thus, after the load change step S19, the voltage continuous application step S18 can be continued with the changed power supply currents IPa of the batteries 1 made uniform to the reference power supply current IPr.

The power supply current IP is relatively less affected by external noise as compared with the battery voltage VB and can be measured at any part where the power supply current IP is flowing. This respect is also advantageous in changing the magnitude of the power-supply current IP, for example, changing the load BL applied to the battery 1 in the load change step to thereby change the component voltage VBB of the battery 1 so that the power-supply current IP flowing in the battery 1 is equal to the reference power-supply current IPr.

Second Embodiment

A second embodiment shows voltage adjustment for equalizing the battery voltages VB of a plurality of batteries 1 each subjected to the first load BL1 (see FIGS. 2 and 3) in the open circuit state or alternatively mutual parallel connection of the batteries 1.

In a load application step S21, a plurality of batteries 1 (see FIGS. 2 and 3) charged with the same battery voltage VB are individually restrained in an elastically compressed state in a battery thickness direction, perpendicular to the paper sheet of FIG. 2, under the first load BL1 by use of the restraining jigs KJ.

In a battery voltage measurement step S22, subsequently, under the first ambient temperature TK1, for each of the batteries 1 having been regulated at the first battery temperature TB1 (TB1=20.0° C.), the first battery voltage VB1 in the open circuit state (the first component voltage VBB1 of the battery component 1B) is measured (see FIG. 1). In each battery 1, as already described, the first battery voltage VB1 in the open circuit state is equal to the first component voltage VBB1 of the battery component 1B.

In a reference/adjusted battery selection step S23, a reference battery 1r and an adjusted battery 1c are selected from among the plurality of batteries 1. Specifically, a specific battery is selected from the batteries 1 and assumed as a reference battery 1r. The first component voltage VBB1 occurring in this selected reference battery 1r is assumed as a reference first component voltage VBB1r. A first battery voltage VB1 in the open state occurring in the reference battery 1r is assumed as a reference first battery voltage VB1r. Further, the battery or batteries, which are different from the reference battery 1r among the batteries 1 and have the first component voltage VBB1 different from the reference first component voltage VBB1r are assumed as an adjusted battery or adjusted batteries 1c.

It is to be noted that any one of the batteries 1 may be appropriately selected as a reference battery 1r; however, a battery having the highest first component voltage VBB1 may be selected as a reference battery 1r. This is because the load BL applied to each adjusted battery 1c is also reduced in the following load change step S24, so that the manipulation of the corresponding restraining jig KJ is made easy. As an alternative, conversely, a battery 1 having the lowest first component voltage VBB1 may be selected as the reference battery 1r. This is because the load BL applied to each adjusted battery 1c is also increased in the following load change step S24.

In the load change step S24, for one adjusted battery 1c or a plurality of adjusted batteries 1c selected in the reference/adjusted battery selection step S23, the load BL is changed to change each component voltage VBB. Specifically, the pressing nut KJMN of each restraining jig KJ (see FIG. 3) is turned to reduce or increase the load BL on the selected adjusted battery or batteries 1c from the first load BL1 to the changed load BLc. With this operation, the component voltage VBB1 (=battery voltage in the open circuit state) of the adjusted battery or batteries 1c is adjusted to the changed component voltage VBBc equal to the reference first component voltage VBB1r of the reference battery 1r (=the reference first battery voltage VB1r).

In an adjustment detection step S25, for all the selected adjusted batteries 1c, it is detected whether or not the component voltage VBB has been adjusted by load change. If No in S25, the process returns to step S24. In contrast, if the component voltages VBB of all the adjusted batteries 1c have been adjusted by load change (S25: Yes), the voltage adjustment of the batteries 1 is finished. Accordingly, for all the batteries 1, their component voltages VBB are equalized to the reference first component voltage VBB1r of the reference battery 1r without charging/discharging, and the battery voltages VB in the open circuit state can be equalized to the reference first battery voltage VBB1r of the reference battery 1r.

In a parallel connection step S26 indicated by a broken line, following the adjustment detection step S25, the plurality of batteries 1 may be connected in parallel to each other. In this case, as described above, the battery voltages VB in the open circuit state of all the batteries 1 are equal to the reference first battery voltage VBB1r. Thus, no current flows due to a voltage difference even if the batteries 1 are connected in parallel to each other. Every battery 1 can therefore remain in a charged state before connection (the component voltage VBB) and starts a parallel-connection state.

Second Modified Embodiment

Figure 6:
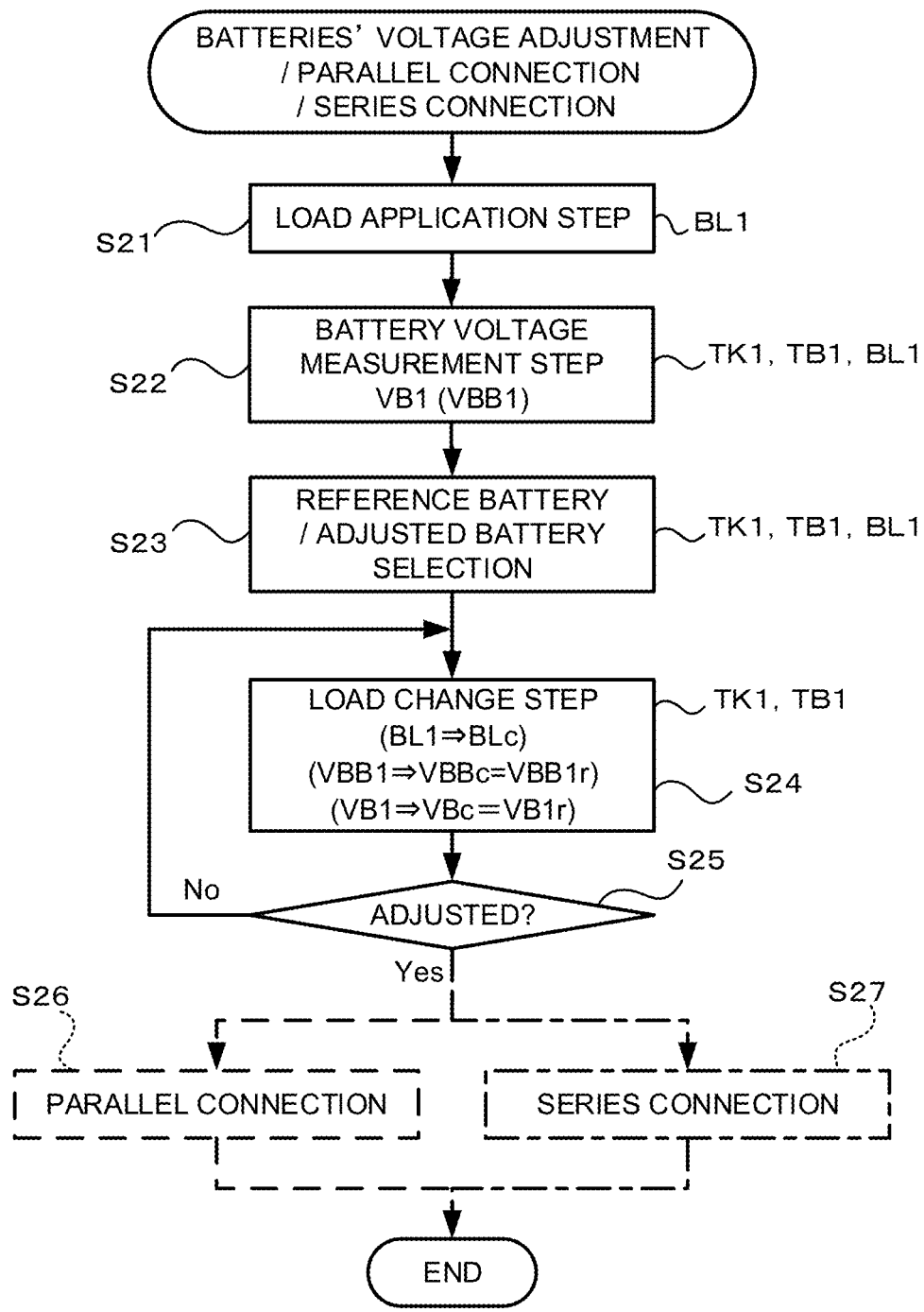
FIG. 6 is a flowchart of a process of voltage adjustment and parallel connection of a plurality of batteries including the load change step in the second embodiment and a second modified embodiment.

As another example, in a series connection step S27 indicated by a long and short dashed line in FIG. 6 following the adjustment detection step S25, a plurality of batteries 1 may be connected in series with each other. In this case, similarly, the battery voltages VB of all the batteries 1 in the open circuit state are equal to the reference first battery voltage VBB1r. That is, the batteries 1 with the same battery voltage VB can be connected in series with each other and start a series-connection state.

The second embodiment and the second modified embodiment exemplify that the battery voltage measurement step S22 is performed after the load application step S21. As an alternative, it may be configured that the uncharged batteries 1X are subjected to a load in the load application step S21 as in the first embodiment, and subsequently the initial charge step S3 to the leaving step S6 are executed as in the first embodiment and then the first battery voltage VB1 of each battery 1 is measured in the battery voltage measurement step S22, and further subsequent steps are performed.

In the second embodiment and the second modified embodiment, the reference battery 1r and the adjusted battery 1c are selected in the reference/adjusted battery selection step S23 and the loads BL on the adjusted batteries 1c are changed to equalize the component voltages VBB to the reference first component voltage VBB1r in the load change step S24. However, without selecting the reference battery 1r and the adjusted battery 1c as in the first embodiment, the loads BL on all the batteries 1 may be changed to equalized the component voltages VBB to the predetermined reference component voltage VBBr.

Third Embodiment

A third embodiment shows an example of adjusting the total voltage of a battery group 1G including a plurality of batteries 1 stacked one on another and connected in series with each other.

Figure 7:
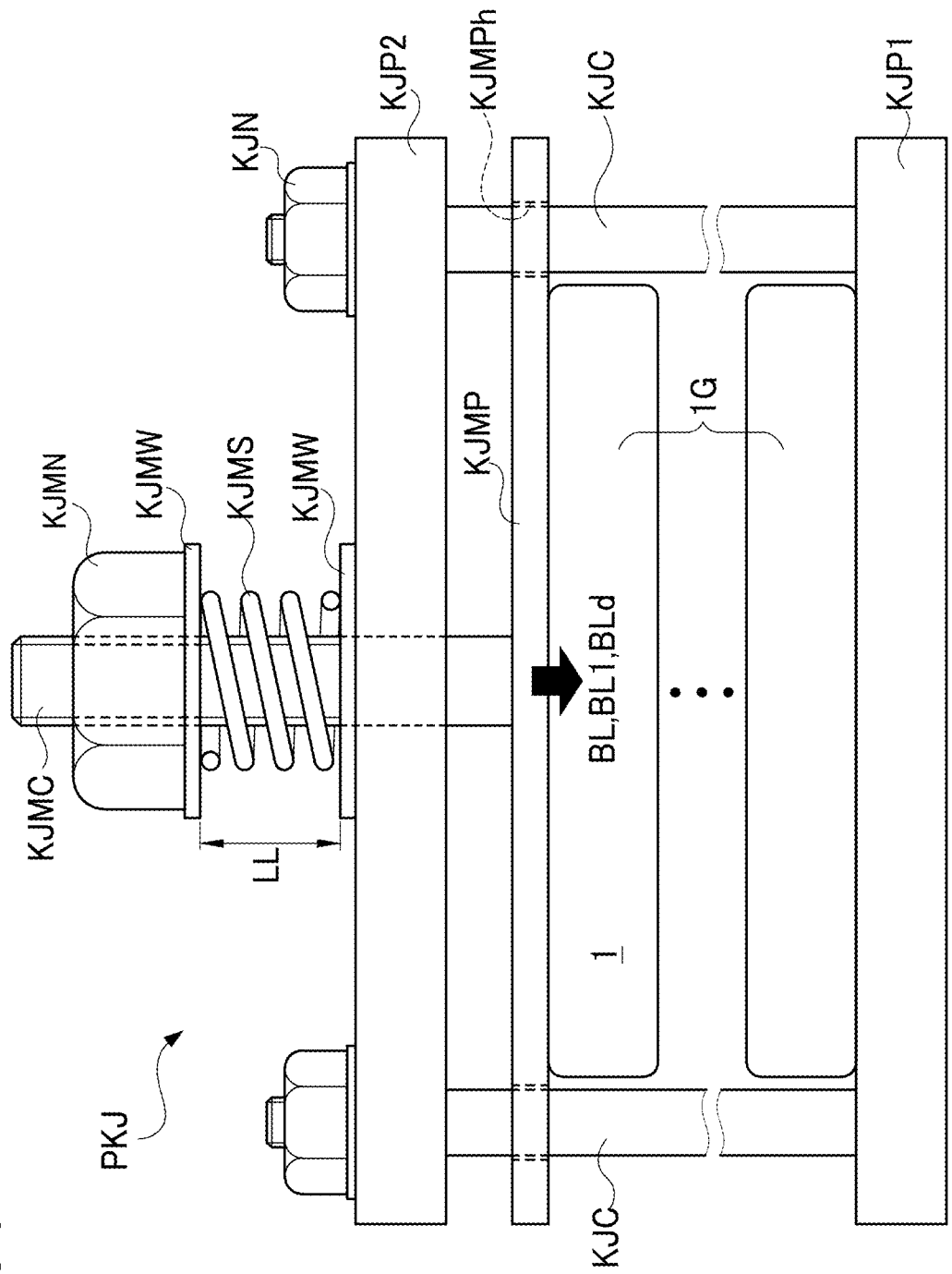
FIG. 7 is an explanatory view showing that the batteries stacked one on another and connected in series with each other are set in the jig capable of increasing and decreasing a load in the third embodiment.
Figure 8:
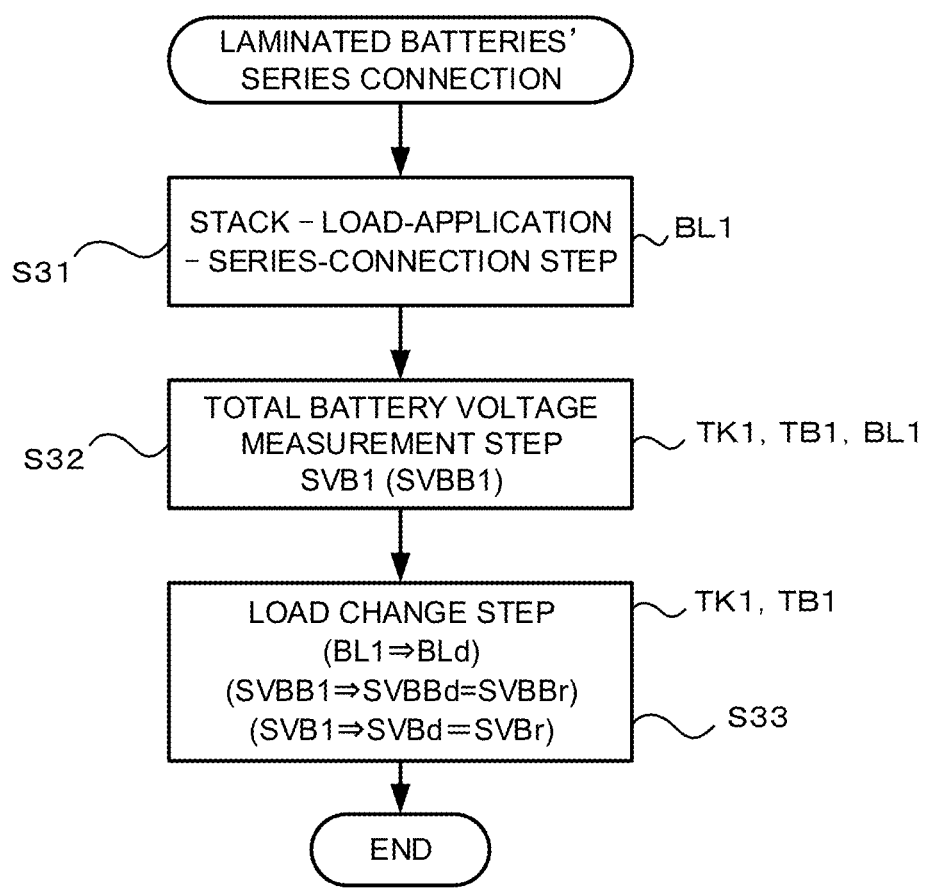
FIG. 8 is a flowchart of a process of total voltage adjustment of a plurality of batteries connected in series including a load change step in the third embodiment.

In a stack—load-application—series-connection step S31, firstly, a plurality of batteries 1 (see FIG. 2) having been charged to substantially the same battery voltage is stacked one on another, these stacked batteries 1 are restrained in an elastically compressed state with a common first load BL1 in a battery thickness direction, which is perpendicular to the paper sheet of FIG. 2, by use of a restraining jig PKJ for multiple batteries shown in FIG. 7. Further, the batteries 1 are connected in series with each other through the terminal members 30 and 40 of the batteries 1.

In a total battery voltage measurement step S32, subsequently, under the first ambient temperature TK1, for the batteries 1 connected in series and regulated at the first battery temperature TB1 (TB1=20.0° C.), a total first battery voltage SVB1 in an open circuit state is measured. In the battery group 1G including those batteries 1 connected in series with each other, the total first battery voltage SVB1 in the open circuit state is equal to a total first component voltage SVBB1 which is the sum of the first component voltages VBB1 of the battery components 1B of the batteries 1 (see FIG. 1), that is, SVB1=SVBB1.

In a load change step S33, the pressing nut KJMN of the restraining jig PKJ is turned so that the load BL applied to the batteries 1 is reduced or increased from the first load BL1 to a changed load BLd. This operation causes the component voltage VBB of each battery 1 (=the battery voltage in the open circuit state) to be changed, so that the total component voltage SVBB, which is the sum of the component voltages VBB of the battery components 1B of the batteries 1, is changed from the total first component voltage SVBB1 and adjusted to conform to a changed total component voltage SVBBd equal to a reference total component voltage SVBBr (SVBBd=SVBBr). Accordingly, the total battery voltage SVB in the open circuit state is changed from the total first battery voltage SVB1 and adjusted to a changed total battery voltage SVBd equal to a reference total battery voltage SVBr (SVBd=SVBr).

The third embodiment adopting the load change step S33 also can change the component voltage VBB of the battery 1 without charging/discharging the battery 1, to adjust the changed total component voltage SVBBd of the batteries 1 connected in series. Thus, a series battery group with the total battery voltage SVBd in the open circuit state adjusted to the changed total battery voltage SVBd equal to the reference total battery voltage SVBr can be easily obtained.

The present disclosure is described as above in the first, second, and third embodiments, and the first and second modified embodiments, but is not limited to the foregoing embodiments and may be embodied in other specific forms without departing from the essential characteristics thereof.

For instance, in the first embodiment and the first modified embodiment, in the process of producing the batteries 1, the inspection step of inspecting the self-discharge of each battery 1 is performed as indicated in the initial battery voltage measurement step S7 through the determination step S12. In contrast, this inspection step may also be applied to the self-discharge inspection of the batteries 1 having been already placed and used on the market.

In the first modified embodiment, the load BL applied to the battery 1 in the load change step is changed to change the component voltage VBB of the battery 1 so that the power-supply current IP flowing in the battery 1 conforms to the reference power-supply current IPr. In addition, the present disclosure is also applicable to other situations for producing a battery (a power storage device) or measuring its property; for example, for CCCV charge or CV charge of the battery 1, the load change step is performed in the ending of charging to increase the load BL applied to the battery 1, slightly increase the component voltage VBB of the battery 1 to accelerate conversion of charged current so that charging can be stopped earlier.

REFERENCE SIGNS LIST

1 Battery (charged) (Power storage device)
1r Reference battery (Reference power storage device)
1c Adjusted battery (Adjusted power storage device)
1G Battery group
S2 Load application step
KJ, PKJ Restraining jig
S7 Initial battery voltage measurement step (Inspection step, Component voltage detection step)
S8 Load application step (Inspection step, Component-voltage change step by load change, Conforming to reference voltage step by load change)
BL Load (applied to battery)
BL1 First load
BLa, BLb, BLc, BLd Changed load
S9, S18 Voltage continuous application step (Inspection step)
S10 Current detection step (Inspection step)
S11 Continuation judgement step (Inspection step)
t Voltage application time
S12 Determination step (Inspection step)
S19 Load change step (Inspection step, Component-voltage change step by load change)
S22 Load application step
S22 Battery voltage measurement step (Multiple component voltage detection step)
S23 Reference/adjusted battery selection step
S24 Load change step (Component-voltage change step by load change, Component-voltage equalization step by load change)
S25 Adjustment detection step
S26 Parallel connection step
S27 Series connection step
S31 Stack—Load-application—Series connection step
S32 Total battery voltage measurement step
S33 Load change step (Component-voltage change step by load change, Conforming to reference total voltage step by load change)
TB Battery temperature (Device temperature)
TB1 First battery temperature (First device temperature)
VB Battery voltage (Device voltage)
SVB Total battery voltage
VB1 First battery voltage
VBr Reference battery voltage
VBa, VBc Changed battery voltage (after load change)
SVBd Total changed battery voltage (after load change)
EP External power supply
VP Power-supply voltage (of external power supply)
VPc Continuous power-supply voltage
IP Power-supply current
IP(n) Power-supply current value (obtained)
IPr Reference power-supply current
1B Battery component (Device component)
VBB Component voltage (generated in battery component)
VBB1 First component voltage
VBBr Reference component voltage
SVBB Total component voltage
SVBBr Reference total component voltage
ΔVBB Component voltage change amount
VBBa, VBBb, VBBc Changed component voltage (after load change)
SVBBd Changed total component voltage (after load change)
Rs DC resistance (of battery) (DC resistance of power storage device)
Rp Short-circuit resistance (of battery) (Short-circuit resistance of power storage device)
ID Self-discharge current
Pc Parallel circuit (formed by battery component and short-circuit resistance)
Ec Equivalent circuit (of battery) (Equivalent circuit of power storage device)

What is claimed is:

1. A method for adjusting a device voltage of a power storage device,
wherein when the power storage device is represented as an equivalent circuit in which a parallel circuit constituted by a capacitive device component and a short-circuit resistance indicating a magnitude of self-discharge of the device component is connected in series with a DC resistance of the power storage device,
the power storage device has a property that, while the power storage device is pressed under a load and the device component is charged to generate a component voltage, the component voltage lowers when the load is reduced, whereas the component voltage rises when the load is increased, and
wherein the method comprises:
component-voltage changing by load change of dynamically changing the load applied to the power storage device, which is pressed under a first load and generates a first component voltage in the device component, from the first load to change the component voltage from the first component voltage.

2. The method for adjusting a device voltage of a power storage device according to claim 1, further comprising:
component-voltage detecting of detecting the first component voltage of the power storage device pressed under the first load, the component-voltage detecting being performed before the component-voltage changing by load change,
wherein the component-voltage changing by load change is configured for
conforming to a reference-voltage by load change of changing the load applied to the power storage device so that a changed component voltage obtained after load change conforms to a reference component voltage.

3. The method for adjusting a device voltage of a power storage device according to claim 1,
wherein the power storage device includes a plurality of power storage devices,
the method further comprises:
multiple-component-voltage detecting of detecting the first component voltage of each of the plurality of power storage devices pressed under the first load, the multiple-component-voltage detecting being performed before the component-voltage changing by load change, and
assuming that:
the first component voltage generated in a reference power storage device selected from the plurality of power storage devices is a reference first component voltage; and
each of the other power storage devices other than the reference power storage device, in which the first component voltage is different from the reference first component voltage, is an adjusted power storage device,
the component-voltage changing by load change is configured for component-voltage equalizing by load change of changing the load applied to the adjusted power storage device so that a changed component voltage of the adjusted power storage device after load change is equal to the reference first component voltage.

4. The method for adjusting a device voltage of a power storage device according to claim 1, wherein the power storage device includes a plurality of power storage devices, the component-voltage changing by load change is configured for
conforming to a reference total voltage by load change of changing the load applied in common to the plurality of power storage devices so that a total component voltage equal to the sum of the component voltages of all the plurality of power storage devices conforms to a reference total component voltage.

5. A method for adjusting a device voltage of a power storage device,
wherein when the power storage device is represented as an equivalent circuit in which a parallel circuit constituted by a capacitive device component and a short-circuit resistance indicating a magnitude of self-discharge of the device component is connected in series with a DC resistance of the power storage device,
the power storage device has a property that, while the power storage device is pressed under a load and the device component is charged to generate a component voltage, the component voltage lowers when the load is reduced, whereas the component voltage rises when the load is increased, and
wherein the method comprises:
component-voltage changing by load change of changing the load applied to the power storage device, which is pressed under a first load and generates a first component voltage in the device component, from the first load to change the component voltage from the first component voltage,
wherein the power storage device includes a plurality of power storage devices,
the method further comprises:
multiple-component-voltage detecting of detecting the first component voltage of each of the plurality of power storage devices pressed under the first load, the multiple-component-voltage detecting being performed before the component-voltage changing by load change, and
assuming that:
the first component voltage generated in a reference power storage device selected from the plurality of power storage devices is a reference first component voltage; and
each of the other power storage devices other than the reference power storage device, in which the first component voltage is different from the reference first component voltage, is an adjusted power storage device,
the component-voltage changing by load change is configured for
component-voltage equalizing by load change of changing the load applied to the adjusted power storage device so that a changed component voltage of the adjusted power storage device after load change is equal to the reference first component voltage.

\* \* \* \* \*